United States Patent
Endo

(10) Patent No.: US 10,361,501 B2
(45) Date of Patent: Jul. 23, 2019

(54) NI-PLATED COPPER OR COPPER ALLOY MATERIAL, CONNECTOR TERMINAL, CONNECTOR AND ELECTRONIC COMPONENT USING THE SAME

(71) Applicant: JX Nippon Mining & Metals Corporation, Chiyoda-ku, Tokyo (JP)

(72) Inventor: Satoru Endo, Ibaraki (JP)

(73) Assignee: JX Nippon Mining & Metals Corporation, Tokyo (JP)

(*) Notice: Subject to any disclaimer, the term of this patent is extended or adjusted under 35 U.S.C. 154(b) by 0 days.

(21) Appl. No.: 16/082,622

(22) PCT Filed: Nov. 29, 2016

(86) PCT No.: PCT/JP2016/085438
§ 371 (c)(1),
(2) Date: Sep. 6, 2018

(87) PCT Pub. No.: WO2017/154288
PCT Pub. Date: Sep. 14, 2017

(65) Prior Publication Data
US 2019/0097341 A1    Mar. 28, 2019

(30) Foreign Application Priority Data
Mar. 9, 2016  (JP) ................. 2016-046074

(51) Int. Cl.
| | |
|---|---|
| *H01R 13/03* | (2006.01) |
| *C25D 5/20* | (2006.01) |
| *C25D 7/00* | (2006.01) |
| *B32B 15/01* | (2006.01) |
| *H01R 12/58* | (2011.01) |

(Continued)

(52) U.S. Cl.
CPC ............. *H01R 13/03* (2013.01); *B32B 15/01* (2013.01); *C25D 5/20* (2013.01); *C25D 7/00* (2013.01); *H01R 12/585* (2013.01); *B32B 2457/00* (2013.01); *C25D 3/12* (2013.01); *C25D 5/34* (2013.01)

(58) Field of Classification Search
CPC ..................................................... H01R 13/03
See application file for complete search history.

(56) References Cited

U.S. PATENT DOCUMENTS

| | | |
|---|---|---|
| 2015/0259813 A1 | 9/2015 | Kodama et al. |
| 2016/0273120 A1 | 9/2016 | Shinohara et al. |

FOREIGN PATENT DOCUMENTS

| | | |
|---|---|---|
| EP | 2899298 A1 | 7/2015 |
| JP | 4-370613 A | 12/1992 |

(Continued)

OTHER PUBLICATIONS

International Search Report and Written Opinion dated Jan. 10, 2017 in corresponding PCT application No. PCT/JP2016/085438.

(Continued)

*Primary Examiner* — Ross N Gushi
(74) *Attorney, Agent, or Firm* — Nields, Lemack & Frame, LLC

(57) ABSTRACT

The present invention provides a Ni-plated copper or copper alloy material having both excellent hardness and excellent bendability.
In the Ni-plated copper or copper alloy material having, an area ratio of a crystal having <001> plane orientation in a crystal plane parallel to a surface of a Ni plating, measured by an electron backscatter diffraction, is 15 to 35%.

9 Claims, 1 Drawing Sheet

(51) Int. Cl.
      *C25D 3/12*          (2006.01)
      *C25D 5/34*          (2006.01)

(56) References Cited

FOREIGN PATENT DOCUMENTS

| | | |
|---|---|---|
| JP | 10-204680 A | 8/1998 |
| JP | 2011-63875 A | 3/2011 |
| JP | 2014-77190 A | 5/2014 |
| JP | 2014-181354 A | 9/2014 |

OTHER PUBLICATIONS

International Preliminary Report on Patentability dated Sep. 20, 2018 in corresponding PCT application No. PCT/JP2016/085438.

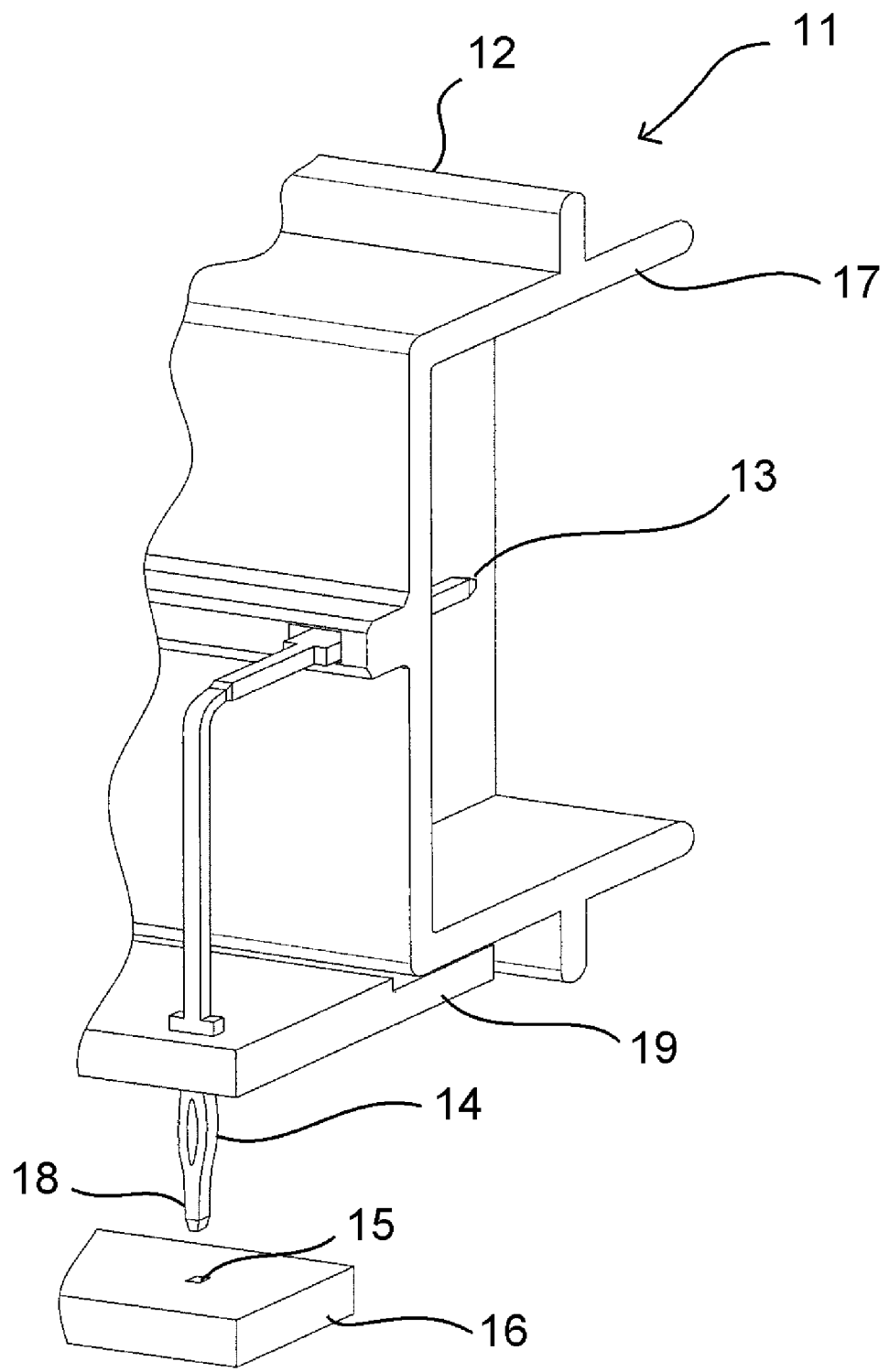

NI-PLATED COPPER OR COPPER ALLOY MATERIAL, CONNECTOR TERMINAL, CONNECTOR AND ELECTRONIC COMPONENT USING THE SAME

TECHNICAL FIELD

The present invention relates to a Ni-plated copper or copper alloy material, connector terminal, connector and electronic component using the same.

BACKGROUND ART

In connectors as connecting components for electronic devices for consumer use and for vehicle use, Ni-plated copper material or Ni-plated copper alloy material are used in which base plating of Ni or the like is applied to the surface of brass or phosphor bronze materials and, if necessary, Sn or Sn alloy plating is further applied to the base plating. Hereinafter, the Ni-plated copper material or the Ni-plated copper alloy material are also referred to as a Ni-plated copper or copper alloy material.

As such Ni-plated copper or copper alloy materials, for example, Patent Literature 1 discloses an electrical contact material including a contact base material, a ground layer composed of Ni formed on the surface of the contact base material, and an Ag-Sn alloy layer formed on the surface of the ground layer. According to Patent Literature 1, an electrical contact material excellent in wear resistance, corrosion resistance and processability is described, and the electrical contact material is described to be able to be produced with an extremely low cost.

CITATION LIST

Patent Literature

[Patent Literature 1] Japanese Unexamined Patent Application Publication No. 04-370613

SUMMARY OF INVENTION

Technical Problem

It is necessary for the Ni-plated copper or copper alloy materials used for a terminal of a connector and the like to have a hardness over an expectation as a connection portion in an electronic component. However, a problem that bendability will be poor arises if the hardness improves. In such problems, prior arts including technique disclosed in Patent Literature 1 still have a room for development.

Solution to Problem

The inventor has diligently studied means for solving the problem, and eventually have found out that, a Ni-plated copper or copper alloy material having both excellent hardness and excellent bendability can be provided by controlling an area ratio of a crystal having <001> plane orientation in a surface of Ni plating to prescribed range.

One or more embodiments of the present application have been completed based on the aforementioned knowledge, and relate to, in one aspect, a Ni-plated copper or copper alloy material, wherein an area ratio of a crystal having <001> plane orientation in a crystal plane parallel to a surface of a Ni plating, measured by an electron backscatter diffraction (EBSD), is 15 to 35%.

In another embodiment of the Ni-plated copper or copper alloy material, the area ratio of the crystal having <001> plane orientation in the crystal plane parallel to the surface of the Ni plating is 15 to 20%.

In still another embodiment of the Ni-plated copper or copper alloy material, an ultrafine indentation hardness of the surface of the Ni plating is 4500 N/mm$^2$ or more.

In still another embodiment of the Ni-plated copper or copper alloy material, the ultrafine indentation hardness of the surface of the Ni plating is 4800 N/mm$^2$ or more.

One or more embodiments of the present application also relates to, in another aspect, a connector terminal comprising a contact part consisting of the Ni-plated copper or copper alloy material according to one or more embodiments of the present application.

One or more embodiments of the present application also relates to, in still another aspect, a connector comprising the connector terminal according to one or more embodiments of the present application.

One or more embodiments of the present application also relates to, in still another aspect, an FFC terminal comprising a contact part consisting of the Ni-plated copper or copper alloy material according to one or more embodiments of the present application.

One or more embodiments of the present application also relates to, in still another aspect, an FPC terminal comprising a contact part consisting of the Ni-plated copper or copper alloy material according to one or more embodiments of the present application.

One or more embodiments of the present application also relates to, in still another aspect, an FFC comprising the FFC terminal according to one or more embodiments of the present application.

One or more embodiments of the present application also relates to, in still another aspect, an FPC comprising the FPC terminal according to one or more embodiments of the present application.

One or more embodiments of the present application also relates to, in still another aspect, an electronic component comprising an external connecting electrode consisting of the Ni-plated copper or copper alloy material according to one or more embodiments of the present application.

One or more embodiments of the present application also relates to, in still another aspect, an electronic component comprising a mounting portion to be attached to a housing, wherein a female terminal connection portion and a board connection portion are provided respectively on one side and the other side of a mounting portion, and a push-in type terminal for fixing the board connection portion to a board by pushing the board connection portion into a through hole formed in the board, wherein the push-in type terminal consists of the Ni-plated copper or copper alloy material according to one or more embodiments of the present application.

Advantageous Effects of Invention

According to the present invention, it is possible to provide a Ni-plated copper or copper alloy material having both excellent hardness and excellent bendability.

BRIEF DESCRIPTION OF DRAWINGS

FIG. 1 is an appearance schematic diagram of the press-fit terminal.

DESCRIPTION OF EMBODIMENTS

Hereinafter, the Ni-plated copper material or Ni-plated copper alloy material (Ni-plated copper or copper alloy material) according to the embodiments of the present invention are described.

<Structure of Ni-plated Copper or Copper Alloy Material>

The Ni-plated copper or copper alloy material according to the embodiments of the present invention comprises copper material or copper alloy material, and Ni plating formed on a surface of the copper material or the copper alloy material.

As the copper alloy material, materials for bending work such as phosphor bronze, copper-titanium alloy, corson alloy, red brass, brass, nickel silver, or other copper alloy can be used. Configurations of the copper alloy materials can be metal strip, metal board or metal foil. The copper alloy materials can be a rolled copper foil or an electrolytic copper foil. The copper alloy materials can be configured to be a complex of copper alloy and resin layer. The complex of copper alloy and resin layer can be, for example, an electrode section on an FPC substrate or an FFC substrate.

A thickness of Ni plating formed on the surface of the copper or copper alloy material is not limited as long as intended hardness and bendability are secured. For example, the thickness of Ni plating formed on the surface of the copper or copper alloy material can be 0.3 to 1.0 μm, 1.0 to 3.0 μm or 3.0 to 5.0 μm.

At least one or more plating layers can be formed on the Ni plating of the Ni-plated copper or copper alloy material. The plating layers are not limited as long as intended hardness and bendability are secured. For example, the plating layers can comprise one or more of elements selected from a group of Sn, In, Ag, Au, Pt, Pd, Ru, Rh, Os and Ir.

Sn and In are metals having oxidizability, while having a feature of relatively soft among metals. Accordingly, even if an oxide film is formed on the surface of Sn and In, low contact resistance can be provided because the oxide film is easily shaved to remove, for example, when a male terminal and a female terminal are engaged by using the Ni-plated copper or copper alloy material as a contact material, and as a result, metals form the contact.

Ag, Au, Pt, Pd, Ru, Rh, Os and Ir have heat resistance relatively among metals. Accordingly, when Sn layer or In layer is formed on the Ni plating, they prevent compositions of copper, copper alloy material or Ni plating from diffusing to the side of Sn layer or In layer of an upper layer to improve heat resistance. Further, these metals inhibit a formation of oxide film of Sn or In by forming compounds with Sn or In of the upper layer, and as the result, solder wettability is improved.

An aftertreatment can be conducted on an outermost surface of the Ni-plated copper or copper alloy material for the purpose of reducing adhesive wear and improving few whisker property and durability. Specific examples of the aftertreatments can be phosphatizing, lubricating treatment, or silane coupling treatment and the like, with an inhibitor.

<Crystal Orientation of Surface of Ni Plating of Ni-plated Copper or Copper Alloy Material>

In the Ni-plated copper or copper alloy material according to the embodiments of the present invention, the area ratio of the crystal having <001> plane orientation in the crystal plane parallel to the surface of the Ni plating, measured by the electron backscatter diffraction (EBSD), is controlled to be 15 to 35%. If the area ratio of the crystal having <001> plane orientation in the crystal plane parallel to the surface of the Ni plating is less than 15%, bendability deteriorates. If the area ratio of the crystal having <001> plane orientation in the crystal plane parallel to the surface of the Ni plating is more than 35%, indentation hardness deteriorates. The area ratio of the crystal having <001> plane orientation in the crystal plane parallel to the surface of the Ni plating is preferably 15 to 20%. If the area ratio of the crystal having <001> plane orientation in the crystal plane parallel to the surface of the Ni plating is controlled to be 15 to 20%, the Ni-plated copper or copper alloy material has more excellent indentation hardness with maintaining excellent bendability.

<Ultrafine Indentation Hardness of Surface of Ni Plating of Ni-plated Copper or Copper Alloy Material>

The ultrafine indentation hardness of the surface of the Ni plating of the Ni-plated copper or copper alloy material according to the embodiments of the present invention is preferably 4500 N/mm$^2$ or more. The ultrafine indentation hardness is a hardness obtained by hitting a dent on the surface of the Ni plating of the Ni-plated copper or copper alloy material with a load of 10 mN on the basis of a fine indentation hardness test. The ultrafine indentation hardness is preferably 4800 N/mm$^2$ or more, and more preferably 5200 N/mm$^2$ or more.

<Applications of Ni-plated Copper or Copper Alloy Material>

Examples of the application of the Ni-plated copper or copper alloy material according to the embodiments of the present invention include, without being particularly limited to: a connector terminal comprising a contact part consisting of the Ni-plated copper or copper alloy material, an FFC terminal or an FPC terminal comprising a contact part consisting of the Ni-plated copper or copper alloy material, and an electronic component comprising an external connecting electrode consisting of the Ni-plated copper or copper alloy material. The terminal does not depend on the connection mode on the wiring side as exemplified by a crimp-type terminal, a soldering terminal and a press-fit terminal. Examples of the external connecting electrode include a connection component prepared by applying a surface treatment to a tab, and surface-treated material for use in under bump metal of a semiconductor.

Connectors can also be prepared by using such connector terminals formed as described above, and an FFC or an FPC can also be prepared by using the FFC terminal or the FPC terminal.

The Ni-plated copper or copper alloy material according to the embodiments of the present invention can also be used in a push-in type terminal 18 for fixing a board connection portion 14 to a board 16 by pushing the board connection portion 14 into a through hole 15 formed in the board 16, wherein a female terminal connection portion 13 and the board connection portion 14 are provided respectively on one side and the other side of a mounting portion 19 to be attached to a housing 17 having insulator 12 as shown in an appearance schematic diagram of the press-fit terminal 11 of FIG. 1.

In the connector, both of the male terminal and the female terminal can be made of the Ni-plated copper or copper alloy material according to the embodiments of the present invention, or only one of the male terminal and the female terminal can be made of the Ni-plated copper or copper alloy material according to the embodiments of the present invention.

<Method for Producing Ni-plated Copper or Copper Alloy Material>

Next, a method for producing the Ni-plated copper or copper alloy material according to the embodiments of the present invention is described.

First, copper or copper alloy material are prepared. Metal materials such as stainless steel can be used in case they are used in a portion where electrical conductivity is not required. Next, Ni plating is formed on the surface of the copper or copper alloy material by electrolytic Ni plating. The electrolytic Ni plating conditions are as follows.

(Electrolyte composition) Nickel sulfamate plating bath: Ni concentration 100 to 120 g/L
(Bath temperature) 40 to 60° C.
(Current density) 4 to 16 A/dm$^2$
(Current-carrying time) 20 to 120 seconds
(Stirring of electrolytic bath) Stirring by ultrasonic disperser (Ultrasonic frequency: 20 kHz)

The Stirring of electrolytic bath is conducted with stirring by ultrasonic disperser. Specifically, the electrolytic bath is stirred by the ultrasonic disperser during the electrolysis. A pressure difference is generated in the electrolyte by the ultrasonic disperser to produce a high-temperature/high-pressure reaction field and particles in the electrolyte gravitate toward the reaction field. At that time, aggregated particles are teared off because of an acceleration difference by particle sizes. Accordingly, aggregated particles disaggregate to produce fine particles. Further, hydrogen gas generated by the electrolysis is removed by a defoaming action of ultrasonic wave. Therefore, the Ni-plated copper or copper alloy material according to the embodiments of the present invention can be produced by the electrolytic Ni plating with ultrasonic stirring. In addition, the hydrogen gas generated by the electrolysis at the plating can be removed by the electrolytic Ni plating with ultrasonic stirring. Accordingly, bending workability of produced Ni-plated copper or copper alloy material improves without hydrogen embrittlement. Crystal orientation of the surface of the Ni plating of the Ni-plated copper or copper alloy material can be controlled by an adjustment of current density and ultrasonic power at the ultrasonic stirring. The ultrasonic power at the ultrasonic stirring is controlled to be 500 W or more. If the ultrasonic power at the ultrasonic stirring is less than 500 W, a dissolution of the aggregation of particles in the electrolyte is insufficient, and as the result, the crystal orientation of the surface of the Ni plating of the Ni-plated copper or copper alloy material defined in the present invention cannot be produced. The ultrasonic power at the ultrasonic stirring can be 500 to 600 W.

EXAMPLES

Hereinafter, Examples will be described with comparative examples in order to understand the present invention and advantages thereof better. However, the present invention is not limited to these examples.

1. Production of Ni-plated Copper or Copper Alloy Material

First, as Examples 1 to 12 and Comparative Examples 1 to 10, each plate having a composition of phosphor bronze, brass, tough pitch copper or copper-titanium alloy was prepared. Each of the plates has a thickness of 0.2 mm, a length of 100 mm and a width of 24 mm. With regard to Vickers hardness (Hv(0.3)), phosphor bronze has 212, tough pitch copper has 98, brass has 141 and copper-titanium alloy has 278.

Next, an electrolytic degreasing was conducted to a surface of the plate, and then, an electrolytic Ni plating was conducted to an area from end to a position at a length of 80 mm in the surface of the plate under the following conditions after pickling, to produce a Ni plating having a thickness of 1.0 μm.

(Electrolyte composition) Nickel sulfamate plating bath: Ni concentration 110 g/L
Mat Ni plating was produced with no additive agent.
(Bath temperature) 55° C.
(Current density) Described in Tables 1 and 2.
(Current-carrying time) 20 to 120 seconds
(Stirring of electrolytic bath) Stirring by stirrer and ultrasonic stirring were conducted as follows.
Rotational speed of stirrer: Described in Tables 1 and 2.
Stirring by ultrasonic disperser (UH-600 S manufactured by SMT Corporation: Ultrasonic homogenizer). Ultrasonic power is described in Tables 1 and 2.

2. Evaluation Test

Crystal Orientation

EBSD (Electron Back Scatter Diffraction) measurement was conducted by introducing a surface of the Ni plating of the samples to SU70 manufactured by HITACHI HIGH-TECHNOLOGIES Corporation. As an analytical software, OIM ver.5.31 provided with EBSD device, manufactured by TSL SOLUTIONS Corporation, was used.

Acceleration voltage: 15 kV
Angle of inclination: 70°
Stepsize: 0.2 μm

Area ratio of the crystal having <001> plane orientation in the crystal plane parallel to the surface of the Ni plating was calculated based on the results of measured EBDS.

Indentation Hardness

The indentation hardness was measured by hitting a dent on the surface of the Ni plating with a load of 10 mN on the basis of the fine indentation hardness test with ENT-2100 manufactured by ELIONIX Corporation.

Bendability

Bendability was evaluated by W-Bend test as follows.

As a test device, an autograph manufactured by SHIMADZU Corporation (AG-100KNG) was used. The test sample (processed to strip form: thickness of 0.2 mm×length of 50 mm×width of 10 mm) was taken out parallel to rolling direction and the test was conducted with G.W. Bending (warped axis of the bending is perpendicular to rolling direction). The W-Bend test was conducted such that a surface of bending portion was observed with a digital microscope manufactured by KEYENCE Corporation and a cross section of bending portion was observed with a scanning electron microscope (S-3400N) manufactured by HITACHI HIGH-TECHNOLOGIES Corporation, based on a technical standard of Japan Copper and Brass Association. Bend radius R was 0.1 mm, 1.0 mm.

With regard to an evaluation criterion, when the bending portion of the sample was visually observed, the sample in which no wrinkle was observed was rated as "A", the sample in which small wrinkle was observed was rated as "B", the sample in which large wrinkle was observed was rated as "C", the sample in which small break was observed was rated as "D" and the sample in which large break was observed was rated as "E". The rates "A" and "B" were defined as excellent bendability.

Conditions and results of the tests were shown in Tables 1 and 2.

TABLE 1

|  |  | raw material | Hv hardness of raw material | Rotational speed of stirrer (rpm) | Current density: Dk (A/dm²) | Ultrasonic power (W) | Ultrafine indentation hardness (N/mm²) | W-Bend R0.1 | W-Bend R1.0 | EBSD area ratio of cystal having[001] plane orientation |
|---|---|---|---|---|---|---|---|---|---|---|
| Example | 1 | phosphor bronze | 212 | 0 | 16 | 600 | 5152 | B | A | 18.3% |
|  | 2 | phosphor bronze | 212 | 500 | 16 | 600 | 5162 | B | A | 17.8% |
|  | 3 | phosphor bronze | 212 | 1000 | 16 | 600 | 5249 | B | A | 19.4% |
|  | 4 | phosphor bronze | 212 | 1500 | 16 | 600 | 5206 | B | A | 18.8% |
|  | 5 | phosphor bronze | 212 | 1000 | 4 | 600 | 4614 | B | A | 31.7% |
|  | 6 | phosphor bronze | 212 | 1000 | 8 | 600 | 4968 | B | A | 27.8% |
|  | 7 | phosphor bronze | 212 | 1000 | 12 | 600 | 5007 | B | A | 22.1% |
|  | 8 | phosphor bronze | 212 | 1000 | 16 | 600 | 5281 | B | A | 17.4% |
|  | 9 | phosphor bronze | 212 | 1000 | 16 | 500 | 5152 | B | A | 16.6% |
| Comparative Example | 1 | phosphor bronze | 212 | 1000 | 4 | 0 | 4221 | C | A | 43.1% |
|  | 2 | phosphor bronze | 212 | 1000 | 8 | 0 | 4403 | C | A | 9.2% |
|  | 3 | phosphor bronze | 212 | 1000 | 12 | 0 | 4722 | D | A | 1.2% |
|  | 4 | phosphor bronze | 212 | 1000 | 16 | 0 | 4900 | E | B | 0.4% |
|  | 5 | phosphor bronze | 212 | 1000 | 16 | 400 | 5065 | C | A | 9.7% |
|  | 6 | phosphor bronze | 212 | 500 | 16 | 0 | 4838 | E | C | 0.6% |

TABLE 2

|  | raw material | Hv hardness of raw material | Rotational speed of stirrer (rpm) | Current density: Dk (A/dm²) | Ultrasonic power (W) | Ultrafine indentation hardness (N/mm²) | W-Bend R0.1 | W-Bend R1.0 | EBSD area ratio of cystal having[001]plane orientation |
|---|---|---|---|---|---|---|---|---|---|
| Example10 | tough pitch copper | 98 | 1000 | 16 | 600 | 5195 | A | A | 16.9% |
| Comparative Example7 | tough pitch copper | 98 | 1000 | 16 | 0 | 4761 | B | A | 1.1% |
| Comparative Example8 | tough pitch copper | 98 | 1000 | 4 | 0 | 4037 | B | A | 44.2% |
| Example11 | brass | 141 | 1000 | 16 | 600 | 5243 | A | A | 17.1% |
| Comparative Example9 | brass | 141 | 1000 | 16 | 0 | 4891 | B | A | 0.9% |
| Example12 | copper-titanium alloy | 278 | 1000 | 16 | 600 | 5312 | D | B | 17.8% |
| Comparative Example10 | copper-titanium alloy | 278 | 1000 | 16 | 0 | 4917 | E | C | 0.5% |

<Evaluations>

With regard to each of Examples 1 to 9 in which the test was conducted by using phosphor bronze, the area ratio of the crystal having <001> plane orientation in the crystal plane parallel to the surface of the Ni plating, measured by the electron backscatter diffraction (EBSD) was 15 to 35%, and had both excellent ultrafine indentation hardness and excellent bendability.

With regard to Comparative Example 1, the area ratio of the crystal having <001> plane orientation in the crystal plane parallel to the surface of the Ni plating, measured by the electron backscatter diffraction (EBSD) was more than 35%, and had poor ultrafine indentation hardness.

With regard to each of Comparative Examples 2 to 6 in which the test was conducted by using phosphor bronze, the area ratio of the crystal having <001> plane orientation in the crystal plane parallel to the surface of the Ni plating, measured by the electron backscatter diffraction (EBSD) was less than 15%, and had poor bendability as copper alloy material prepared by a raw material of phosphor bronze.

With regard to Examples 10 to 12 and Comparative Examples 7 to 10, the test was conducted and evaluated by conducting Ni plating on the surface of copper other than phosphor bronze, brass, copper-titanium alloy. In the W-Bend test at R=0.1 mm of copper-titanium alloy having high intensity property, Examples also generated a break. However, though not as much as phosphor bronze, improvement was observed in the W-Bend test at large R (R=1.0 mm). It was found that brass having low intensity property showed excellent bending workability for Examples compared with Comparative Examples even in the W-Bend test at R=0.1 mm.

Copper-titanium alloy is a raw material having significantly poor bending workability. Comparative Example 10 was rated as "E" in the W-Bend test at R=0.1 mm and rated as "C" in the W-Bend test at R=1.0 mm. On the other hand, remarkable improvement effect for bending workability was observed in Example 12 in which it was rated as "D" in the W-Bend test at R=0.1 mm and rated as "B" in the W-Bend test at R=1.0 mm, by controlling the area ratio of the crystal having <001> plane orientation in the crystal plane parallel to the surface of the Ni plating, measured by the electron backscatter diffraction (EBSD), to 15 to 35%.

REFERENCE SIGNS LIST

11 Press-fit terminal
12 Insulator

13 Female terminal connection portion
14 Board connection portion
15 Through hole
16 Board
17 Housing
18 Push-in type terminal
19 Mounting portion

What is claimed is:

1. A Ni-plated copper or copper alloy material, wherein an area ratio of a crystal having <001> plane orientation in a crystal plane parallel to a surface of a Ni plating, measured by an electron backscatter diffraction, is 15 to 35%.

2. The Ni-plated copper or copper alloy material according to claim 1, wherein the area ratio of the crystal having <001> plane orientation in the crystal plane parallel to the surface of the Ni plating is 15 to 20%.

3. The Ni-plated copper or copper alloy material according to claim 1, wherein an ultrafine indentation hardness of the surface of the Ni plating is 4500N/mm$^2$ or more.

4. The Ni-plated copper or copper alloy material according to claim 3, wherein the ultrafine indentation hardness of the surface of the Ni plating is 4800N/mm$^2$ or more.

5. A connector terminal comprising a contact part consisting of the Ni-plated copper or copper alloy material according to claim 1.

6. An FFC terminal comprising a contact part consisting of the Ni-plated copper or copper alloy material according to claim 1.

7. An FPC terminal comprising a contact part consisting of the Ni-plated copper or copper alloy material according to claim 1.

8. An electronic component comprising an external connecting electrode consisting of the Ni-plated copper or copper alloy material according to claim 1.

9. An electronic component comprising
a mounting portion to be attached to a housing, wherein a female terminal connection portion and a board connection portion are provided respectively on one side and the other side of a mounting portion, and
a push-in type terminal for fixing the board connection portion to a board by pushing the board connection portion into a through hole formed in the board, wherein the push-in type terminal consists of the Ni-plated copper or copper alloy material according to claim 1.

* * * * *